R. HOOD.
SPRING WHEEL.
APPLICATION FILED JULY 24, 1911.
1,029,755.
Patented June 18, 1912.
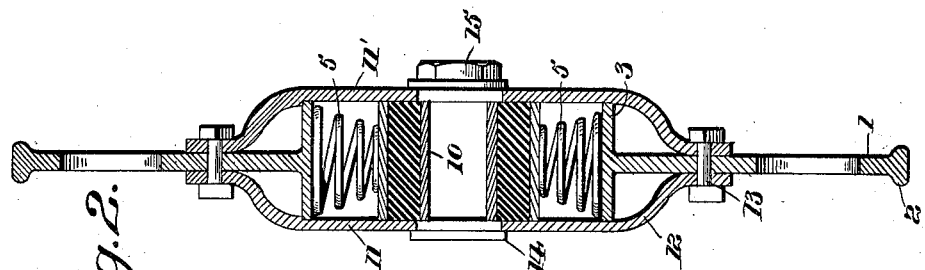
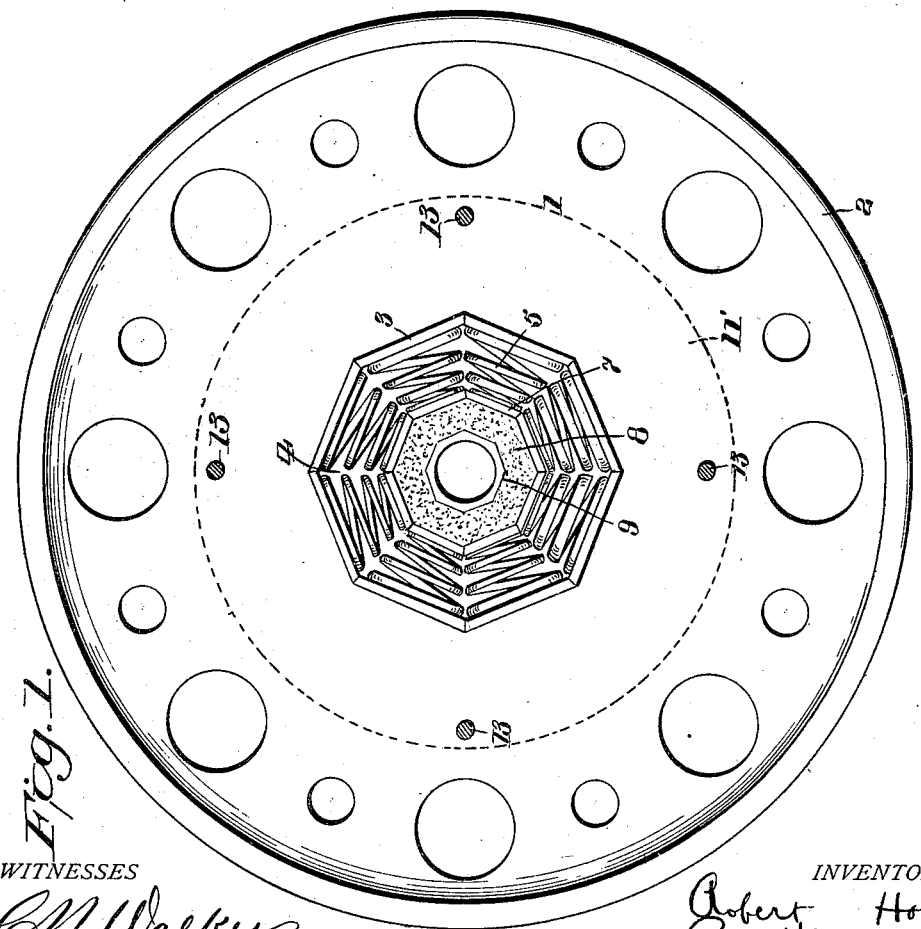
WITNESSES
INVENTOR

UNITED STATES PATENT OFFICE.

ROBERT HOOD, OF CEDARVILLE, OHIO.

SPRING-WHEEL.

1,029,755.

Specification of Letters Patent.   Patented June 18, 1912.

Application filed July 24, 1911.   Serial No. 640,355.

*To all whom it may concern:*

Be it known that I, ROBERT HOOD, a citizen of the United States, residing at Cedarville, in the county of Greene and State of Ohio, have invented certain new and useful Improvements in Spring-Wheels, of which the following is a specification.

This invention relates to spring wheels and has for its object to provide a cushioned support for vehicles which while possessing all the advantages and resilient qualities of the ordinary pneumatic tire will be much more durable and consequently less expensive.

With these and other objects in view which will be apparent as the description proceeds the invention consists of certain novel features of construction and combination of parts more fully set forth and described in the accompanying specification and drawings in which:

Figure 1 is a side view of the invention with one of the plates removed and Fig. 2 is a sectional view.

Referring more specifically to the drawings in which like references designate corresponding parts in each of the views 1 represents a metallic disk having an enlarged peripheral tread portion 2, and a flanged inner edge 3 which encircles a central opening 4 through the disk. The flanged edge 3 is of octagonal formation to accommodate and form seats for the outer ends of a plurality of conical coil springs 5 the inner ends of which bear against the angular faces 6 of an octagonal tubular member 7. Arranged within the inner member 7 is a resilient member 8 preferably of rubber centrally bored as at 9 to receive the axle bearing or sleeve 10.

It will be noted (Fig. 1) that the flange 3 and members 7, 8 and 10 which are all of the same width are each of octagonal formation and graduated in size to permit of one being nested within the other with an intervening space between the flange 3 and member 7 for the accommodation of the springs 5. Side plates 11 and 11', curved inwardly at their peripheral edges as at 12 and secured to the tread disk 1 by means of bolts 13 form a casing for the parts just described.

The wheel axle (not shown) is passed through the collar 14 and secured within the sleeve 10 by means of a nut 15 or in any other preferable or well known manner.

From the foregoing it will be seen that the axle is supported by a series of octagonal ring like members separated one from the other by cushion members which receive and distribute the shock incident to the passage of the wheel over an obstruction.

As the body of the vehicle is supported directly from the axle (not shown) within the sleeve 10, any severe shock will cause the vehicle body together with sleeve 10, cushion member 8, and tubular member 7 to drop or vibrate between the confining side plates 11 and 11'. Such movement is restricted by the coil springs 5 which form an effective cushion.

Having thus described my invention, what I claim is:

A vehicle wheel comprising a disk having a central opening, said disk having a tread portion and an integral annular flange of octagonal formation, a tubular member of octagonal formation within said opening spaced from said flange, a tubular octagonally formed axle sleeve within said tubular member but spaced therefrom, a rubber ring of octagonal formation disposed between said sleeve and said tubular member, a plurality of conical springs between said flange and said tubular member, and side plates secured to said disk.

In testimony whereof I affix my signature in presence of two witnesses.

ROBERT HOOD.

Witnesses:
JOHN G. MCCORKELL,
J. S. TOWNSLEY.

Copies of this patent may be obtained for five cents each, by addressing the "Commissioner of Patents, Washington, D. C."